(12) United States Patent
Al-Regib et al.

(10) Patent No.: US 10,598,281 B2
(45) Date of Patent: Mar. 24, 2020

(54) OVERRIDE FOR SHIFTING A SHIFT-BY-WIRE TRANSMISSION

(71) Applicant: Ford Global Technologies, LLC, Dearborn, MI (US)

(72) Inventors: Emad Al-Regib, Westland, MI (US); Todd Curtis Spaulding, Ann Arbor, MI (US); Craig Matthew Renneker, Northville, MI (US); Bryant L. Poynter, Redford, MI (US); Susan Wyatt, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 530 days.

(21) Appl. No.: 15/371,376

(22) Filed: Dec. 7, 2016

(65) Prior Publication Data

US 2018/0156333 A1    Jun. 7, 2018

(51) Int. Cl.
*F16H 63/34*    (2006.01)

(52) U.S. Cl.
CPC ..... *F16H 63/3491* (2013.01); *F16H 63/3416* (2013.01)

(58) Field of Classification Search
CPC .................................................. F16H 63/3491
See application file for complete search history.

(56) References Cited

U.S. PATENT DOCUMENTS

| | | | |
|---|---|---|---|
| 6,592,492 B1 | 7/2003 | Kalia | |
| 6,732,847 B1 | 5/2004 | Wang | |
| 6,918,314 B2 | 7/2005 | Wang | |
| 7,832,302 B2 | 11/2010 | Wang | |
| 7,934,590 B2 | 5/2011 | Duhaime et al. | |
| 10,221,946 B1* | 3/2019 | Pai | F16H 63/3491 |
| 2015/0034450 A1* | 2/2015 | Spooner | F16H 63/3491 192/220.2 |
| 2015/0122068 A1* | 5/2015 | Hopkins | F16H 63/3491 74/473.24 |
| 2015/0308571 A1* | 10/2015 | Wyatt | F16H 63/3491 192/219.5 |
| 2017/0314677 A1* | 11/2017 | DeVos | F16H 63/3491 |
| 2018/0320787 A1* | 11/2018 | Ljulj | F16H 63/3491 |
| 2018/0370501 A1* | 12/2018 | Singleton | F16H 61/36 |

* cited by examiner

*Primary Examiner* — William Kelleher
*Assistant Examiner* — Gregory T Prather
(74) *Attorney, Agent, or Firm* — Vincent Mastrogiacomo; Brooks Kushman, P.C.

(57) ABSTRACT

An override mechanism for a shift-by-wire transmission includes a housing having a first pin aperture and a shaft extending into the housing. The override mechanism further includes a reel plate having a second pin aperture. The reel plate is rotatably fixed to the shaft and rotatable within the housing. The override mechanism further includes a spring biasing the reel plate to a first angular position, and a pull-pin removably disposable within the first and second pin apertures to retain the reel plate in a second angular position.

13 Claims, 5 Drawing Sheets

OVERRIDE FOR SHIFTING A SHIFT-BY-WIRE TRANSMISSION

TECHNICAL FIELD

This disclosure relates to automatic transmissions and in particular to shift-by-wire transmissions. More particularly, this disclosure relates to an override for shifting a shift-by-wire transmission from a Park position without engine power.

BACKGROUND

A traditional automatic transmission includes a transmission control device employed to control the transmission of a motor vehicle. The transmission control device is used to select several ranges, such as Park, wherein the transmission is locked to prevent the vehicle from moving, Neutral, wherein the transmission allows the vehicle to be moved freely, such as when being towed, Reverse, wherein the transmission allows the vehicle to move backwards, and one or more Drive ranges that enable forward motion of the vehicle. Usually, the transmission control device is in the form of a lever connected to the transmission via a mechanical connection, such as a cable. Typically, the lever is also connected to an indicator. As the transmission control mechanism is moved from one range to another, the mechanical connection physically shifts the transmission to the selected setting and the indicator moves to show the driver which range has been selected. Even if the vehicle is turned off, the driver is able to determine the current transmission range from the indicator and, in some cases, is able to move the transmission control mechanism to Neutral if, for example, the vehicle is to be towed.

The traditional automatic transmission utilizes multiple friction elements for automatic gear ratio shifting. Broadly speaking, these friction elements may be described as torque establishing elements, although more commonly they are referred to as clutches or brakes. The friction elements function to establish power flow paths from an internal combustion engine to a set of vehicle traction wheels. During acceleration of the vehicle, the overall speed ratio, which is the ratio of a transmission input shaft speed to a transmission output shaft speed, is reduced during a ratio upshift as vehicle speed increases for a given engine throttle setting. A downshift to achieve a higher speed ratio occurs as an engine throttle setting increases for any given vehicle speed, or when the vehicle speed decreases as the engine throttle setting is decreased. Various planetary gear configurations are found in modern automatic transmissions. However, the basic principle of shift kinematics remains similar. Shifting an automatic transmission having multiple planetary gear sets is accompanied by applying and/or releasing friction elements to change speed and torque relationships by altering the torque path through the planetary gear sets. Friction elements are usually actuated either hydraulically or mechanically based on the position of the transmission control device.

In a shift-by-wire transmission arrangement, the mechanical connection between the transmission control device and the transmission is eliminated. Instead, the transmission control device transmits an electrical signal to an electronic controller, which directs separate actuators to apply or release the various friction elements to obtain a desired gear ratio. The control device is no longer necessarily in the form of a lever because the control device is no longer moving a mechanical connection for controlling the transmission. Instead, the control device is typically an electro-mechanical interface (e.g., a series of buttons, lever, or knob) that is used to instruct the transmission to switch between the transmission ranges. Shift-by-wire transmissions typically default to the PARK position when certain conditions occur (e.g., loss of electrical power or transmission hydraulic power or when a driver opens the door while the transmission is not in PARK).

SUMMARY

A shift-by-wire transmission according to the present disclosure includes a shiftable member selectively engageable with a park gear to put a vehicle in PARK. The shift-by-wire transmission also includes a first intermediate member coupled with the shiftable member and rotatable about a pivot axis between an engaged position and a disengaged position. In the engaged position, the shiftable member is engaged with the park gear. In the disengaged position, the shiftable member is disengaged from the park gear.

The shift-by-wire transmission also includes an override mechanism having a housing disposed at an exterior of a transmission case. The housing has a first pin aperture and a fastener aperture for receiving a fastener to rotatably fix the housing to the transmission case.

The shift-by-wire transmission also includes a manual shaft extending from an interior of the housing through the transmission case to an interior of the transmission case.

The shift-by-wire transmission also includes a reel plate having a second pin aperture. The reel plate is rotatably fixed to the manual shaft and is rotatable within the housing between a first angular position relative to the housing and a second angular position relative to the housing.

The shift-by-wire transmission also includes a spring for biasing the reel plate to the first angular position, and a pull-pin removably disposable within the first and second pin apertures. The pull-pin is adapted to retain the reel plate in the second angular position.

The shift-by-wire transmission also includes a second intermediate member rotatably fixed to the manual shaft and rotatable about the pivot axis between a nominal position and an override position. Moving the second intermediate member from the nominal position to the override position moves the first intermediate member from the engaged position to the disengaged position.

In another approach, an override mechanism for a shift-by-wire transmission includes a housing having a first pin aperture and a shaft extending into the housing. The override mechanism further includes a reel plate having a second pin aperture. The reel plate is rotatably fixed to the shaft and is rotatable within the housing. The override mechanism further includes a spring biasing the reel plate to a first angular position, and a pull-pin removably disposable within the first and second pin apertures to retain the reel plate in a second angular position.

In another approach, a method for operating a park override at a shift-by-wire transmission includes positioning an override module about a manual shaft at an exterior of a transmission case such that manual shaft extends through a reel plate disposed in a housing of the override module. The override module includes a pull-pin disposed through a first pin aperture in the housing and a second pin aperture in the reel plate to rotatably fix the reel plate to the housing in a first angular position. The reel plate is biased to a second angular position by a spring.

The method also includes rotating the housing in a first rotational direction relative to the transmission case such that rotation of the housing rotates the reel plate and the manual shaft to move a park mechanism to a disengaged position. The method also includes rotatably fixing the housing to the transmission case to retain the park mechanism in the disengage position.

The approaches described herein provide a number of advantages. For example, the present disclosure provides an override for shifting a transmission out of park in the absence of engine power. Systems and methods according to the present disclosure may avoid routing override cables to a passenger cabin, thus reducing packaging complexity and cost. Furthermore, systems and methods according to the present disclosure provide an externally accessible release pin that remains stationary during normal operating conditions, and thus is less susceptible to damage due to mud or ice buildup on the release pin.

The above advantage and other advantages and features of the present disclosure will be apparent from the following detailed description of the preferred approaches when taken in connection with the accompanying drawings.

DETAILED DESCRIPTION

Figure 1:
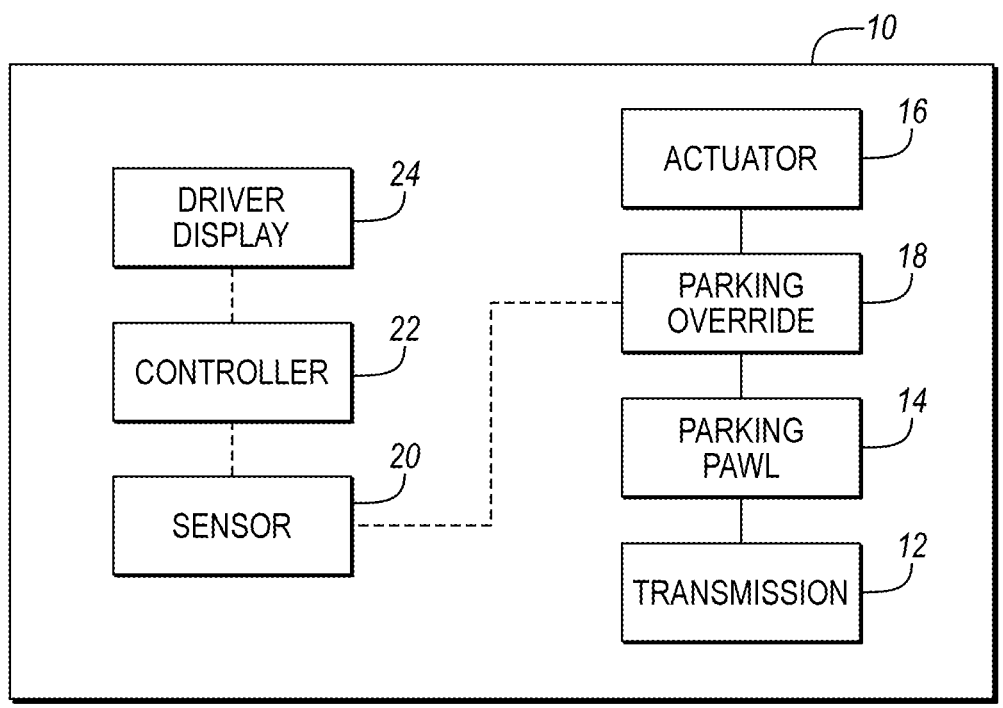
FIG. 1 is a schematic representation of a vehicle including a shift-by-wire transmission.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A shift-by-wire transmission refers to an arrangement having no mechanical connection between a transmission control device and the transmission. Instead, a user-operated gear shift module transmits an electrical signal to an electronic controller, which directs separate actuators to apply or release the various friction elements, such as clutches or brakes, to obtain a desired gear ratio. In some approaches, the transmission may be provided with a parking pawl that is operated by one of the actuators. The parking pawl may engage with at least one gear in the transmission to inhibit vehicle motion or release from the at least one gear to permit vehicle motion. The parking pawl may be engaged in response to a driver shifting the transmission to PARK. Of course, various other parking elements may also be used to inhibit vehicle motion, such as a parking brake.

In some configurations, the actuators operating the friction elements and parking pawl are hydraulic actuators. Under normal vehicle operation, an engine drives a transmission pump to supply hydraulic pressure to the actuators and enable application or release of the friction elements or parking brake. Because there is not a mechanical connection between the gear shift module and the transmission, in the absence of hydraulic pressure to the actuators, a driver will be unable to shift the transmission from Park to other gears. When the engine is off, the gear shift module may not be usable to shift gears.

Under some circumstances, however, it may be desirable to shift the vehicle from PARK to another gear without the engine running. For example, if the engine is inoperable, it may be desirable to shift the transmission out of PARK to facilitate towing. As an additional example, it may be desirable to roll the vehicle to a new location without running the engine. Using the standard gear shift module, shifting out of PARK without operating the engine is not possible. Consequently, the transmissions may be provided with a manual override mechanism. This may include a mechanism available under the vehicle hood or a cable mechanism available within the cabin. Such solutions may be difficult for a user to access, difficult to route through a vehicle, and also add complexity and cost to the vehicle. In addition, known override mechanisms that are accessible under the vehicle hood include an external override lever that moves during normal transmission operation. Such external moving parts are susceptible to mud, snow, ice, or other debris accumulating and inhibiting transmission operation.

Referring now to FIG. 1, a vehicle 10 is illustrated in schematic form. The vehicle 10 includes a shift-by-wire transmission 12. The transmission 12 includes an associated parking pawl 14 that is selectively engageable with a gear (not illustrated) in the transmission to restrain vehicle motion. The transmission 12 additionally includes at least one associated actuator 16. The actuator 16 is configured to selectively engage or disengage the parking pawl 14. Additional actuators (not shown) may control various other friction devices, such as clutches and brakes, to selectively transmit power from a vehicle engine (not illustrated) to vehicle wheels (not illustrated) according to various gear ratios. The transmission additionally includes an associated parking override device 18, which will be discussed in greater detail below. The parking override device 18 is configured to selectively shift the vehicle out of PARK in response to a manual input.

The vehicle 10 additionally includes a sensor 20 configured to detect a position of the parking override device 18. The sensor 20 is in communication with or under the control of at least one controller 22. In various approaches, the controller or controllers 22 may be a vehicle system controller or a plurality of controllers in communication with each other. The controller or controllers 22 may, of course, be in communication with various other sensors and vehicle components not illustrated in FIG. 1. The controller 22 is configured to transmit various messages and/or alerts to a driver display 24. The driver display may include a dashboard warning light, a multi-function display, an audio alert, or various other methods of communicating information to a user.

Figure 2:
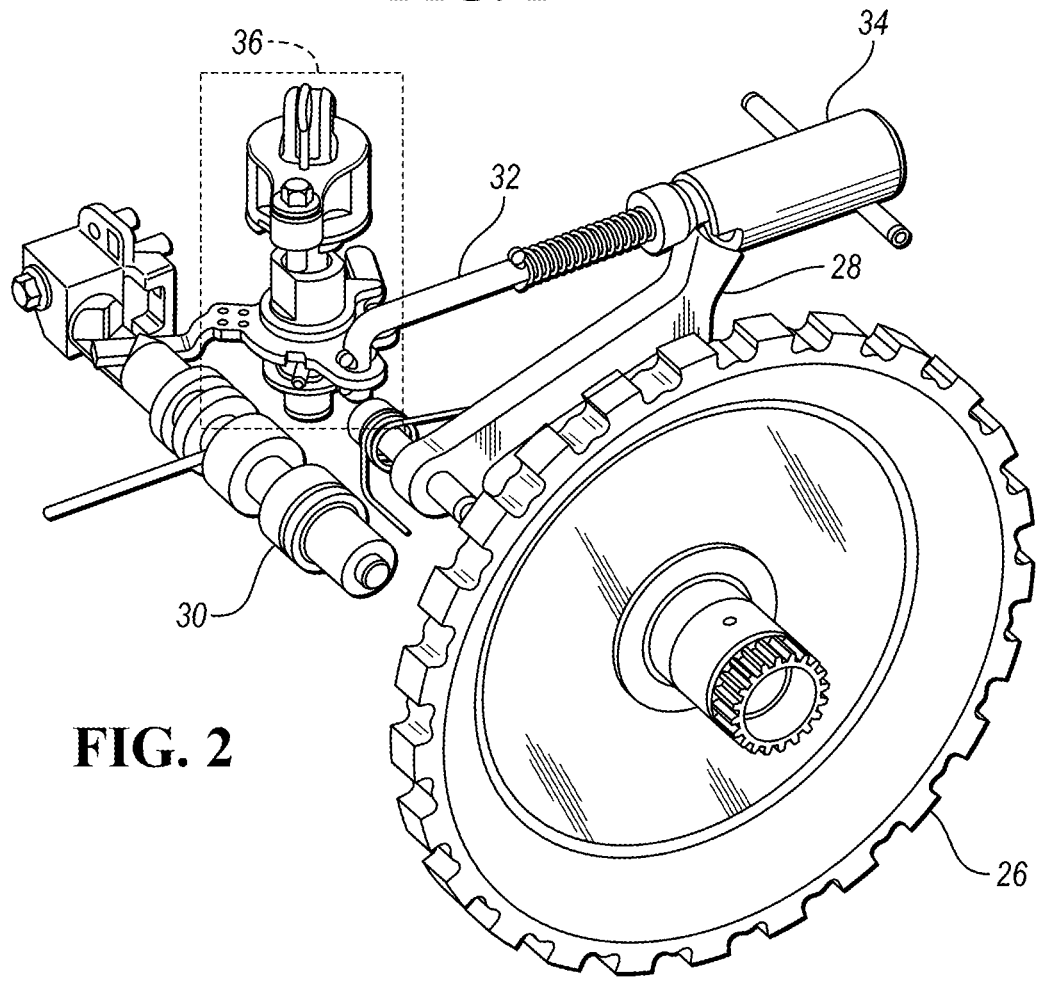
FIG. 2 is an isometric view of a parking assembly of a shift-by-wire transmission including an override system.

Referring now to FIG. 2, an isometric view of a parking assembly of a shift-by-wire transmission including an override system is illustrated. The transmission includes at least one gear set 26. A shiftable member such as a parking pawl 28 is selectively engageable with a gear 26 of the gear set. When engaged, the parking pawl 28 restrains vehicle motion. An actuator 30, which may be hydraulic or electric, engages and/or disengages the parking pawl 28 via a link arm 32 and linkage 34. A parking override device 36 is operably connected to the link arm 32.

Figure 3:
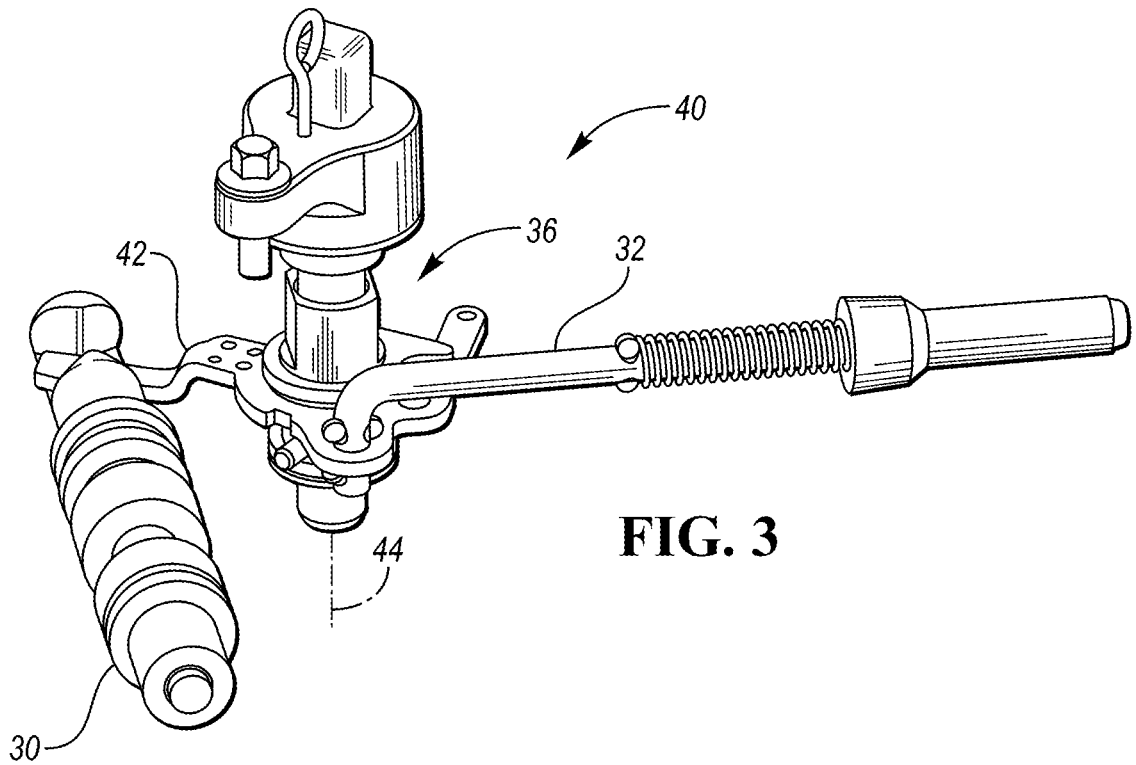
FIG. 3 is an isometric view of a parking mechanism with an override system.

Referring now to FIG. 3, an isometric view of a parking mechanism 40 is illustrated. An actuator 30, which may include a hydraulic valve, is drivably coupled with a first intermediate member, such as a park lever 42. The park lever 42 is also drivably connected to a link arm 32. The park lever 42 and associated components, including the actuator 30 and link arm 32, are preferably retained within the transmission case.

Figure 9:
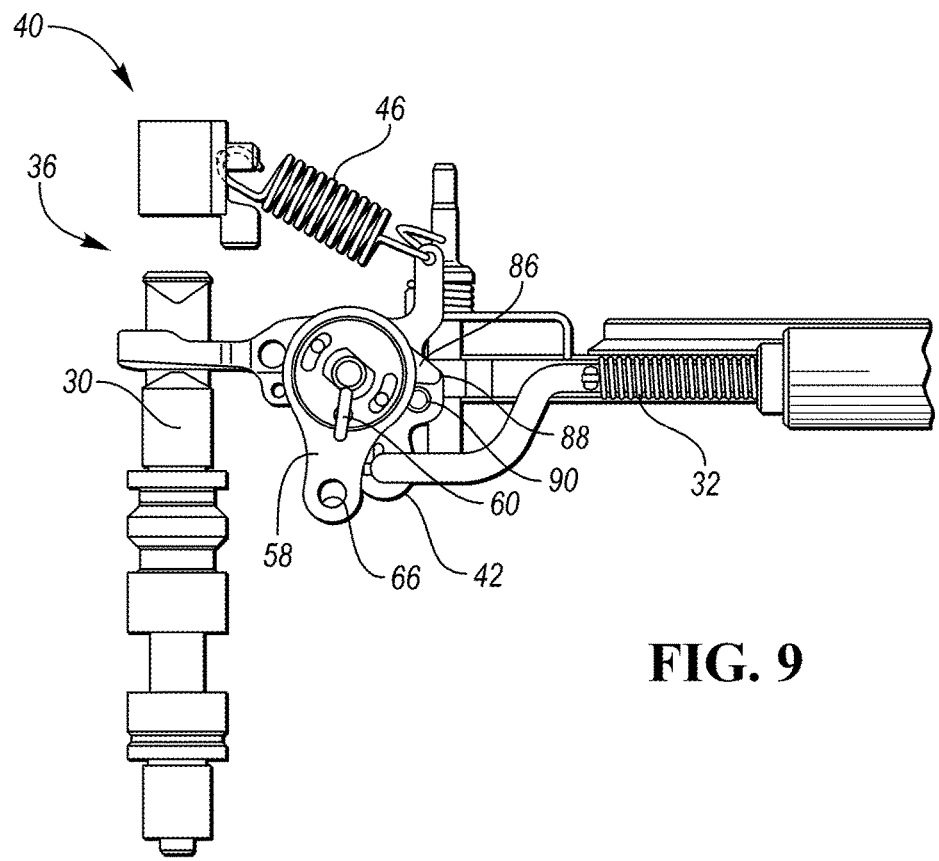
FIG. 9 is a top plan view of a parking mechanism with an override system in a first configuration.

The park lever 42 is movable between various positions, including a first position, which may be a "PARK" position in which a parking pawl is engaged with a gear of a transmission, and a second position, which may be a "NOT PARK" position in which a parking pawl is disengaged from a gear of a transmission. The park lever 42 is configured to pivot about a pivot axis 44 among the various positions. In a preferred approach, the park lever 42 is biased toward the PARK position, for example, by a compression spring 46 (as shown in FIG. 9). Such an assembly may be referred to as having a "RETURN TO PARK" function.

The parking override assembly additionally includes an override mechanism 36 that is also configured to pivot about the pivot axis 44. The override mechanism 36 is configured to pivot between various positions, including a first position, which may be a "nominal" position for normal operation, and a second position, which may be an "override" position. The override mechanism 36 is positioned outside of the transmission case for ease of access. The override mechanism 36 is configured to pivot separately from the park lever 42, such that when the override mechanism 36 is in the nominal position (i.e., normal operation), the override mechanism 36 remains stationary as the park lever 42 pivots between the PARK and NOT PARK positions.

Figure 4:
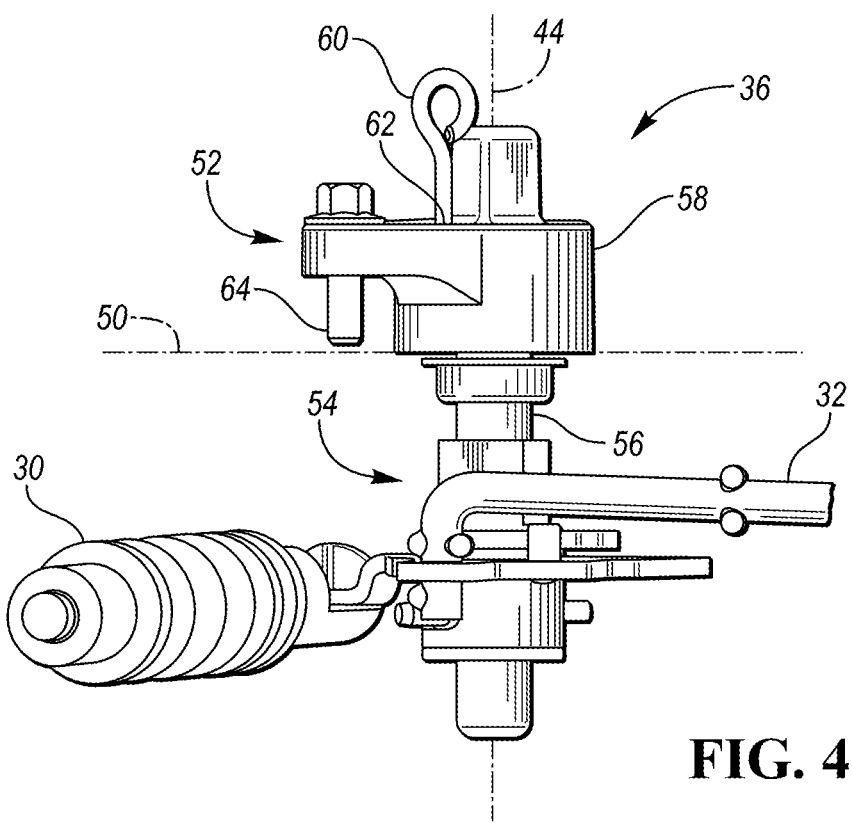
FIG. 4 is another isometric view of a parking mechanism with an override system.

Referring to FIG. 4, the override mechanism 36 includes an outer module 52 positioned outside of the transmission case 50. The override mechanism 36 further includes inner components 54 positioned within the transmission case 50, and a manual shaft 56 extending from the outside of the transmission case 50 to the inside of the transmission case 50. It should be noted that in this context, "inner" refers to the positioning of the components relative to a transmission case.

The outer module 52 includes a housing 58, a pull-pin 60 sized to be inserted in an aperture 62 of the housing 58, and a fastener such as a bolt 64 for securing the housing 58 to the transmission case 50 through a fastener aperture 66. In the approach shown in FIG. 4, a single fastener 64 is shown. However, it is expressly contemplated that two or more fasteners may be used to secure the housing 58 to the transmission case 50.

Figure 5:
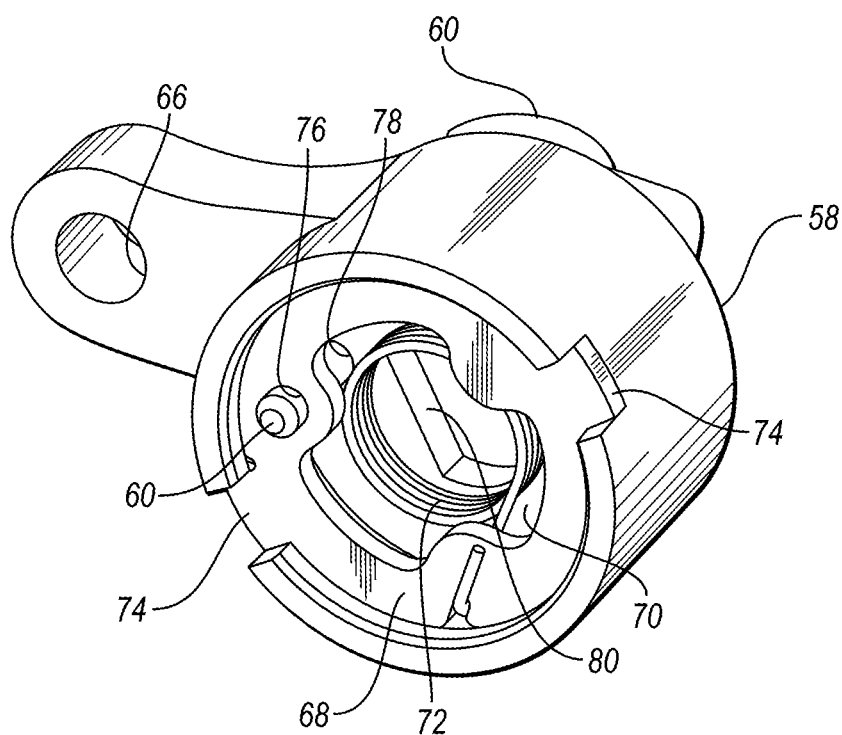
FIG. 5 is an isometric view of an outer module of an override system.

Referring to FIG. 5, within the housing 58 of the outer module 52 are a retainer plate 68, a reel 70, and a torsion spring 72. The retainer plate 68 is rotatably fixed to the housing 58 by one or more keys 74. Thus, rotation of the housing 58 effects rotation of the retainer plate 68. The retainer plate 68 includes an aperture 76 for receiving the pull-pin 60.

Figure 6:
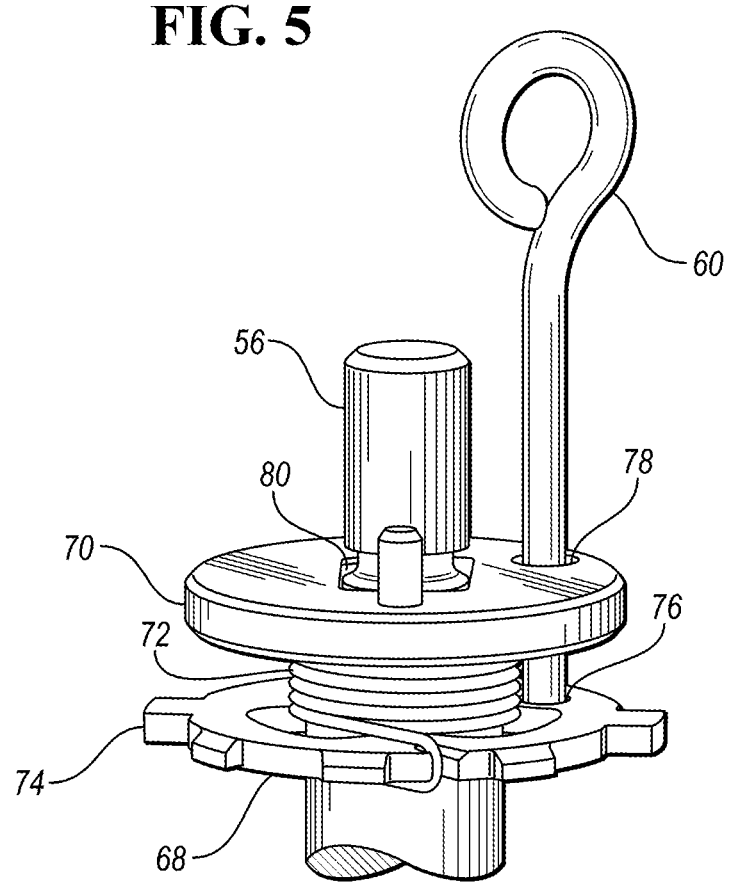
FIG. 6 is an isometric view of an outer module with a housing removed.

As shown in FIGS. 5 and 6, the reel 70 similarly includes an aperture 78 for receiving the pull-pin 60. The reel 70 also includes an inner aperture 80 for receiving the manual shaft 56. In a preferred approach, the inner aperture 80 is a non-circular aperture adapted to engage a non-circular cross-sectional portion of the manual shaft 56. In this way, rotation of the reel 70 effects rotation of the manual shaft 56.

The torsion spring 72 is secured at one end to the retainer plate 68, and at the other end to the reel 70. For example, the torsion spring 72 may be secured to the retainer plate 68 at a notch in the periphery of the retainer plate 68. The torsion spring 72 may be secured to the reel 70 at a protrusion protruding from a surface of the reel 70 opposite the retainer plate 68. As will be apparent from the disclosure, when the pull-pin 60 is inserted in both the retainer plate aperture 76 and the reel aperture 78, the torsion spring 72 is adapted to bias the reel 70 and manual shaft 56 in a NOT PARK position in which a parking pawl is disengaged from a gear of a transmission.

Figure 7:
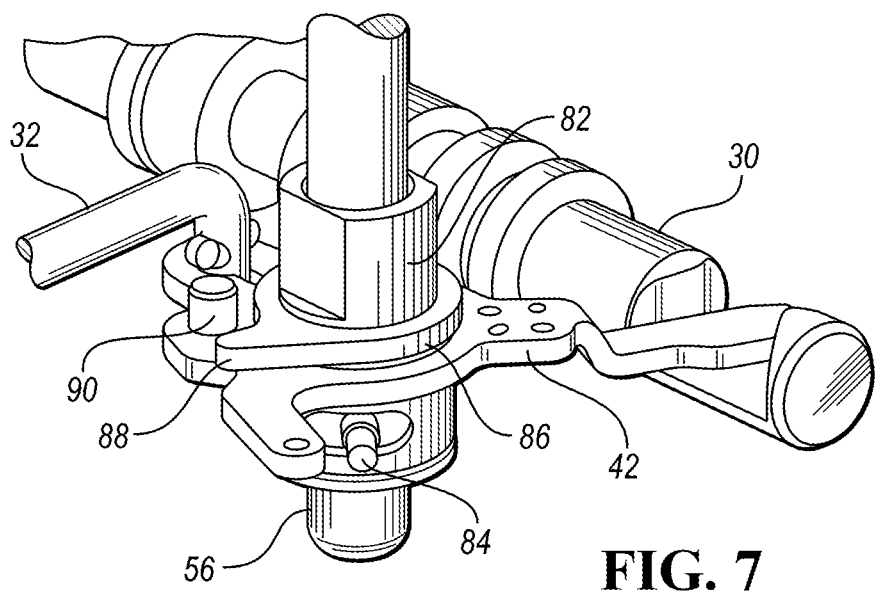
FIG. 7 is an isometric view of inner components of an override system.
Figure 8:
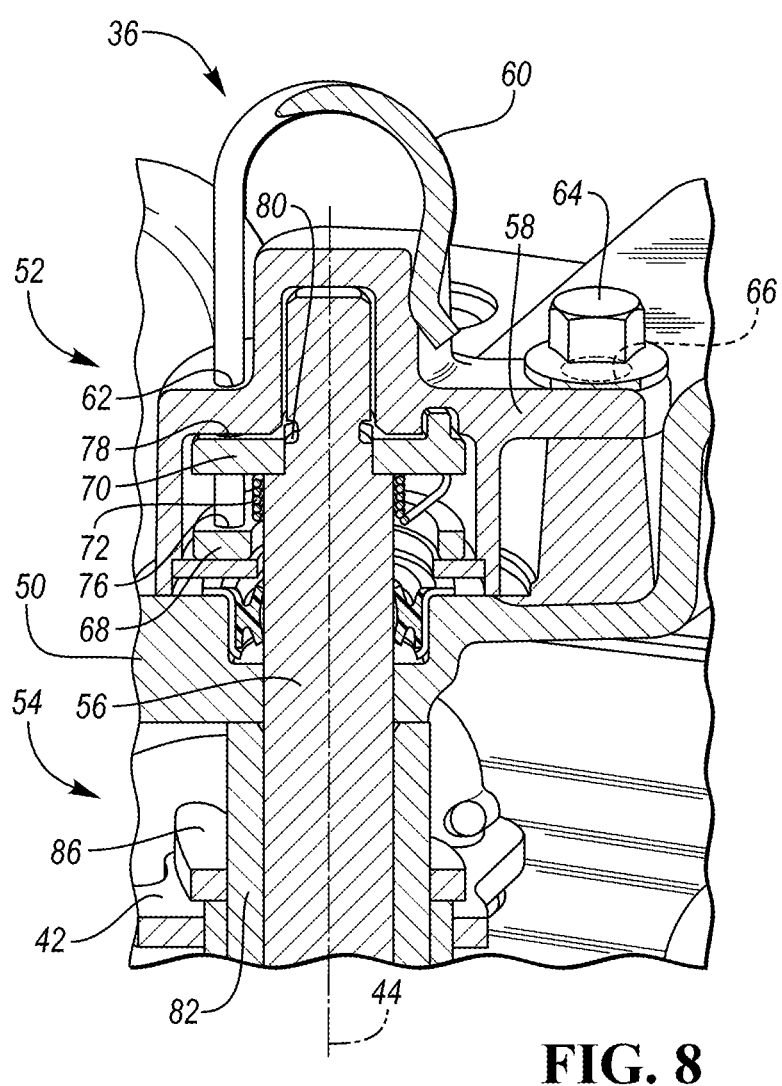
FIG. 8 is a cross-sectional view of an override system.

The inner components 54 of the override mechanism 36 are shown in greater detail in FIGS. 7 and 8. The manual shaft 56 extends through a hub 82. A pin 84 extends through the manual shaft 56 and the hub 82 to rotatably fix the manual shaft 56 to the hub 82. In this way, rotation of the manual shaft 56 (e.g., as caused by rotation of the reel 70) causes the pin 84 to rotate the hub 82.

A second intermediate member, such as an override lever 86, is secured to the hub 82 such that rotation of the hub 82 causes rotation of the override lever 86. For example, the override lever 86 may include a non-circular aperture adapted to engage a non-circular cross-sectional portion of the hub 82.

The override lever 86 is disposed about a periphery of the hub 82 and is rotatable about the pivot axis 44. The override lever 86 is rotatably fix to the hub 82 such that rotation of the override lever 86 causes the override lever 86 to rotate between a nominal position and an override position. When rotated from the nominal position to the override position, a portion of the override lever 86, such as a finger 88 protruding from the override lever 86, engages and drives an override pin 90 extending from the park lever 42. The pin 90 extends from a face of the override lever 86 through a plane of pivoting motion through which the finger 88 pivots.

When driven by the finger 88 of the override lever 86, the pin 90 causes rotation of the park lever 42. As discussed herein, rotation of the park lever 42 causes the parking mechanism 40 to move between a PARK position in which a parking pawl is engaged with a gear of a transmission, and a NOT PARK position in which a parking pawl is disengaged from a gear of a transmission. In this way, rotation of the park lever 42 due to the override lever 86 driving the pin 90 causes parking mechanism 40 to move to an "OVERRIDE" position, thereby overriding the tendency of the vehicle to shift to PARK when there is a vehicle power loss. A vehicle in OVERRIDE mode may then be pushed or towed despite, for example, failure of transmission hydraulic pressure, engine failure, or battery failure. Also, the override mechanism 48 can be used in vehicle assembly operation when there is not power provided to the transmission, allowing assembly of the vehicle and pushing the vehicles through the assembly process. At the end of the assembly process, the pull-pin 60 can be pulled to allow the park mechanism 40 to be in the nominal position.

The override mechanism 36 may be installed in transmission that defaults to the NOT PARK position. For example, the override mechanism 36 may be installed at a manufacturing facility prior to the transmission having functional shift-by-wire capabilities.

A method for installing an override mechanism (e.g., override mechanism 36) includes priming an outer module 52 having a housing 58, a retainer plate 68 disposed within the housing 58 and rotationally fixed to the housing 58, a reel 70 disposed within the housing 58, and a torsion spring 72 disposed between the retainer plate 68 and the reel 70, the torsion spring 72 being connected at opposite ends to the retainer plate 68 and the reel 70, respectively.

The outer module 52 is primed by axially aligning an aperture 62 of the housing 58, an aperture 78 of the reel 70, and an aperture 76 of the retainer plate 68. A pull-pin 60 may be inserted through the aperture 62 of the housing 58, through the aperture 78 of the reel 70, and through the aperture 76 of the retainer plate 68. In this way, the reel 70 is rotationally fixed to the housing 58 in a first angular position through the pull-pin 60.

In the primed configuration, the torsion spring 72 exerts a rotational force on the reel 70 and retainer plate 68. However, rotation of the retainer plate 68 relative to the reel 70 is inhibited due to one or more keys 74, as shown in FIG. 5. Rotation of the reel 70 relative to the retainer plate 68 is inhibited due pull-pin 60 passing through the apertures 76, 78 of the retainer plate 68 and the reel 70.

At the transmission, the primed outer module 52 is positioned about an outer portion of a manual shaft (e.g., manual shaft 56) such that the manual shaft 56 extends through the retainer plate 68, the torsion spring 72, and an inner aperture 80 of the reel 70. The inner aperture 80 of the reel 70 is a non-circular aperture adapted to engage a non-circular cross-sectional portion of the manual shaft 56. In this way, the manual shaft 56 is rotationally fixed to the reel 70 such that rotation of the reel 70 effects rotation of the manual shaft 56.

The primed outer module 52 is positioned on the transmission case 50, but is not yet secured to the transmission case 50. Thus, the outer module 52 is rotatable about a pivot axis 44 relative to the transmission case 50.

FIG. 9 shows a parking mechanism 40 in which the actuator 30 is not actuated, and the link arm 32 is extended. This may be referred to as a PARK position in which a parking pawl is engaged with a gear of a transmission.

To enable a movement of a vehicle having a transmission that defaults to the PARK position, a primed override mechanism 36 may move the parking mechanism 40 to an OVERRIDE position in which the actuator 30 is not actuated, but the link arm 32 is withdrawn, thereby disengaging the parking pawl from the gear of the transmission.

Figure 10:
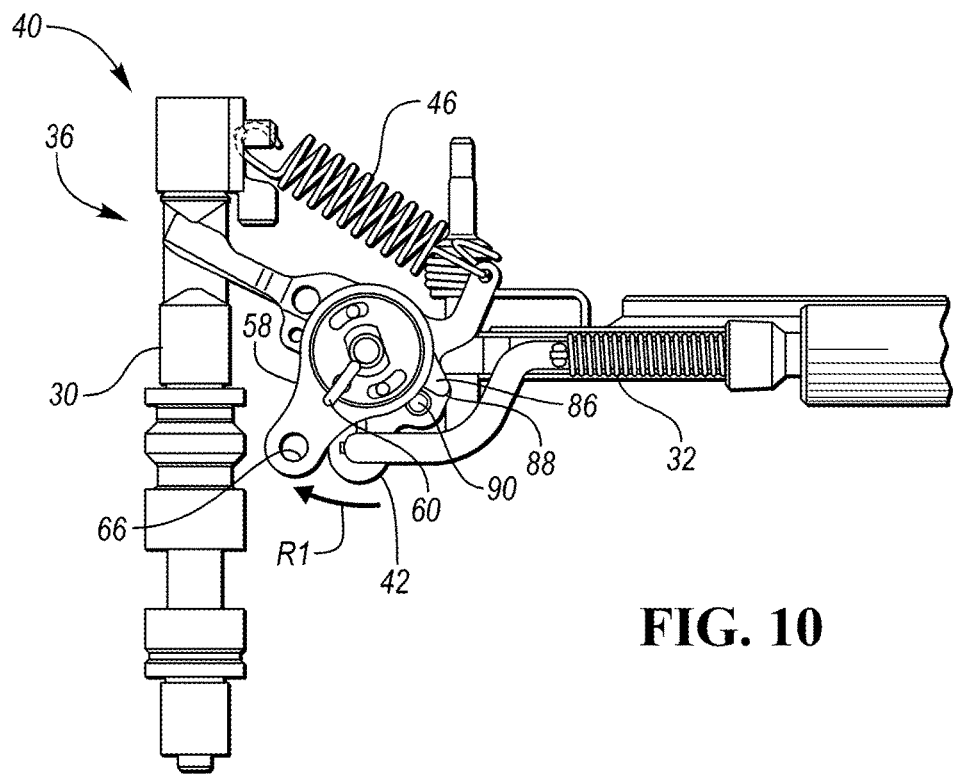
FIG. 10 is a top plan view of a parking mechanism with an override system in a second configuration.

Referring now to FIG. 10, to activate the OVERRIDE position, an operator rotates the housing 58 of the primed outer module 52 in a first rotational direction (e.g., R1) about the pivot axis 44 relative to the transmission case 50. Because the reel 70 is rotationally fixed to the housing 58 via the pull-pin 60, and is rotationally fixed to the manual shaft 56 via the non-circular aperture 80, rotation of the housing 58 effects rotation of the manual shaft 56.

As described herein, the manual shaft 56 is rotationally fixed to an override lever 86 via a pin 84 and hub 82 assembly. Thus, rotation of a primed outer module 52 in the first rotational direction R1 effects rotation of the override lever 86.

Upon sufficient rotation of the override lever 86 in the first rotational direction R1 (e.g., 25° to 35°, and more particularly 28°), the override lever 86 engages the pin 90 of the park lever 42. Continued rotation of the housing 58 causes the override lever 86 to rotate the park lever 42 about the pivot axis 44, thereby withdrawing link arm 32 and disengaging the parking pawl from the gear of the transmission.

When the parking pawl is sufficiently disengaged from the gear of the transmission, the parking mechanism 40 is in the OVERRIDE position. While in the OVERRIDE position, an operator may secure the housing 58 of the outer module 52 to the transmission case to rotatably lock the housing 58 to the transmission case. For example, the operator may pass a fastener (e.g., a bolt) 64 through the fastener aperture 66 of the housing 58 and a corresponding aperture in the transmission case to rotationally fix the housing 58 to the transmission case.

The override mechanism 36 is adapted to maintain the OVERRIDE position as long as the outer module 52 remains primed (i.e., as long as the pull-pin 60 prevents rotation of the reel 70 relative to the retainer plate 68).

A vehicle having a parking mechanism 40 in the OVERRIDE position may be freely moved. For example, it may be desirable to put a vehicle in OVERRIDE in a manufacturing setting, where a transmission may not have functioning park-by-wire capabilities, to move the vehicle through various stages of the manufacturing facility. It may also be desirable to put a non-functioning vehicle in OVERRIDE, for example, to allow the vehicle to be towed.

The override mechanism 36 described herein also provides for a quick-release of the OVERRIDE configuration via the pull-pin 60. That is, when an operator desires to revert the parking mechanism 40 to a RETURN TO PARK configuration, the operator may withdraw the pull-pin 60 from the aperture 76 of the retainer plate 68, though the aperture 78 of the reel 70, and through the aperture 62 of the housing 58. As the pull-pin 60 is withdrawn from the aperture 78 of the reel 70, the rotational force of the torsion spring 72 causes the reel 70 to rotate in a second rotational direction (not shown), opposite the first rotational direction R1, to a second angular position.

Rotation of the reel 70 in the second rotational direction effects a corresponding rotation of the manual shaft 56, the hub 82, and the override lever 86.

Upon sufficient rotation of the override lever 86 in the second rotational direction, the override lever 86 disengages from the pin 90 of the park lever 42. Due to a compression force imparted by the compression spring 46, the park lever 42 rotates in the second rotational direction about the pivot axis 44, thereby driving the link arm 32 and engaging the parking pawl with a gear of a transmission.

Thus, upon removal of the pull-pin 60 from the override mechanism 36, the parking mechanism 40 is reverted to a RETURN TO PARK configuration.

In one approach, the pull-pin 60 is completely removable from the transmission. In this approach, the pull-pin 60 may be discarded, recycled, or reused in subsequent manufacture operations. In another approach, the pull-pin 60 remains secured to the transmission, for example by a strap (not shown). In this approach, the pull-pin 60 may be utilized on the same vehicle, for example, should the vehicle require transport while the park-by-wire mechanism is inoperable.

An operator may subsequently re-enable the OVERRIDE mode. This may be performed by removing the fastener 64 from the transmission case 50 and the aperture 66 of the housing 58, thereby permitting rotation of the outer module 52 about the pivot axis 44 relative to the transmission case 50. The housing 58 of the unprimed outer module 52 may be pivoted about the pivot axis 44 until the apertures 62, 76 of the housing 58 and the retainer plate 68 are axially aligned with the aperture 78 of the reel 70. Upon axial alignment, the pull-pin 60 is reinserted through the apertures 62, 76, 78, thereby rotationally locking the housing 58 to the reel 70. In this way, the outer module 52 is returned to the primed configuration.

The operator may then rotate the housing 58 of the primed outer module 52 in the first rotational direction R1, effecting rotation of the manual shaft 56, the hub 82, and the override lever 86 as previously described herein. Continued rotation of the housing 58 causes the override lever 86 to rotate the park lever 42 about the pivot axis 44, thereby withdrawing the link arm 32 and disengaging the parking pawl from the gear of the transmission. The operator may then secure the housing 58 of the outer module 52 to the transmission case (e.g., using a fastener 64) to rotatably lock the housing 58 to the transmission case, thereby securing the override mechanism 36 in the OVERRIDE position.

Preferably a sensor, such as sensor 20 illustrated in FIG. 1, detects the presence of the park lever 42 and/or the override mechanism 36 in the override position and sends a signal indicating this status to a controller, such as controller 22. In response to the detected presence of the park lever 42 or the override mechanism 36 in the override position, the controller 22 may take various actions. As an example, the controller 22 may signal an alert to a driver via the driver display 24 indicating that the transmission is in an override state in which PARK is unavailable. As another example, the controller 22 may activate a vehicle parking brake in response to a driver selection of PARK on a gear shift module when the transmission 12 is in the override state.

Variations on the above are, of course, possible. For example, in some approaches, a cabling system may be provided from the override lever into a vehicle cabin, enabling a driver to manually shift the vehicle out of PARK without accessing the engine compartment. Additionally, in some embodiments, no extension spring is included to bias the park lever 42 toward the nominal position. In such approaches, only a fastener is included to maintain the park lever 42 in the nominal position.

As can be seen from the various approaches, the present disclosure provides a system and method for shifting a shift-by-wire transmission out of PARK when an engine in the vehicle is off or shift-by-wire actuation is otherwise unavailable. Furthermore, the present disclosure provides such a system and method without the increased cost, complexity, and difficulty of access associated with a manual transmission override system. For example, the override mechanism of the present disclosure provides quick release of the override mode without need for additional tools. The override mechanism may be particularly advantageous in a manufacturing setting where vehicles are assembled while the shift-to-wire transmission is preferably in the override mode, but should be reverted to standard operation after assembly and prior to consumer use. For example, in many vehicle assembly operations, each vehicle is preferably in the override mode during assembly, but is quickly reverted to the normal mode prior to consumer use by pulling the pull-pin as described herein. The pull-pin override mechanism described herein reduces the need for hand- or power-tools in reverting a shift-to-wire transmission to a normal operation mode as, instead of using a hand- or power-tool, an operator needs to merely pull the pull-pin by hand to provide the normal operation mode.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A shift-by-wire transmission comprising:
a shiftable member selectively engageable with a park gear to put a vehicle in PARK;
a first intermediate member coupled with the shiftable member and rotatable about a pivot axis between an engaged position and a disengaged position, wherein in the engaged position the shiftable member is engaged with the park gear and in the disengaged position the shiftable member is disengaged from the park gear; and
an override mechanism including
a housing disposed at an exterior of a transmission case, the housing having a first pin aperture and a fastener aperture for receiving a fastener to rotatably fix the housing to the transmission case,
a manual shaft extending from an interior of the housing through the transmission case to an interior of the transmission case,
a reel plate having a second pin aperture, the reel plate rotatably fixed to the manual shaft and rotatable within the housing between a first angular position relative to the housing and a second angular position relative to the housing,
a spring for biasing the reel plate to the first angular position,
a pull-pin removably disposable within the first and second pin apertures, the pull-pin adapted to retain the reel plate in the second angular position, and
a second intermediate member rotatably fixed to the manual shaft and rotatable about the pivot axis between a nominal position and an override position, wherein moving the second intermediate member from the nominal position to the override position moves the first intermediate member from the engaged position to the disengaged position.

2. The shift-by-wire transmission of claim 1, wherein the second intermediate member includes a flange having a plane of pivoting motion, and wherein the first intermediate member includes a pin extending through the plane of pivoting motion such that pivoting the second intermediate member from the nominal position to the override position engages the flange with the pin to pivot the first intermediate member from the engaged position to the disengaged position.

3. The shift-by-wire transmission of claim 1, wherein in the nominal position, the second intermediate member does not move in response to the first intermediate member moving between the engaged position and disengaged position.

4. The shift-by-wire transmission of claim 1, wherein the first angular position of the reel plate corresponds to the nominal position of the second intermediate member, and wherein the second angular position of the reel plate corresponds to the override position of the second intermediate member.

5. An override mechanism for a shift-by-wire transmission, comprising:
a housing having a first pin aperture;
a shaft extending into the housing;

a reel plate having a second pin aperture, the reel plate rotatably fixed to the shaft and rotatable within the housing;

a spring biasing the reel plate to a first angular position;

a pull-pin removably disposable within the first and second pin apertures to retain the reel plate in a second angular position; and a retainer plate rotatably fixed to the housing, wherein the spring is secured at a first end to the retainer plate and at a second end to the reel plate to bias the reel plate to the second angular position, wherein the retainer plate includes a third pin aperture adapted to receive the pull-pin.

6. The override mechanism of claim 5, wherein the first and second apertures are axially aligned when the reel plate is in the first angular position, and wherein the first and second apertures are axially offset when the reel plate is in the second angular position.

7. The override mechanism of claim 5, wherein the housing further comprises a fastener aperture for receiving a fastener to rotatably fix the housing to a case of the shift-by-wire transmission.

8. The override mechanism of claim 5, further comprising:

an override lever rotatably fixed to the shaft such that rotation of the shaft causes the override lever to rotate between a nominal position and an override position.

9. The override mechanism of claim 8, wherein rotation of the override lever between the nominal position and the override position causes the override lever to engage and drive an override pin extending from a park lever of the shift-by-wire transmission.

10. The override mechanism of claim 9, wherein when the override lever is in the nominal position, the park lever is selectively movable between an engaged position and a disengaged position, and when the override lever is in the override position, the park lever is retained in the disengaged position.

11. The override mechanism of claim 8, wherein the first angular position of the reel plate corresponds to the nominal position of the override lever, and wherein the second angular position of the reel plate corresponds to the override position of the override lever.

12. The override mechanism of claim 8, wherein the housing, the shaft, the reel plate, and the override lever are rotatable about a common pivot axis.

13. The override mechanism of claim 8, wherein the housing and the reel plate are disposed at a first side of a case of the shift-by-wire transmission, wherein the override lever is disposed at a second side of the case of the shift-by-wire transmission opposite the first side, and wherein the shaft extends through the case of the shift-by-wire transmission from the first side to the second side.

* * * * *